Feb. 28, 1933.　　　　G. D. CLARK　　　　1,899,672
FLUID FLOW INDICATOR
Filed Jan. 18, 1929
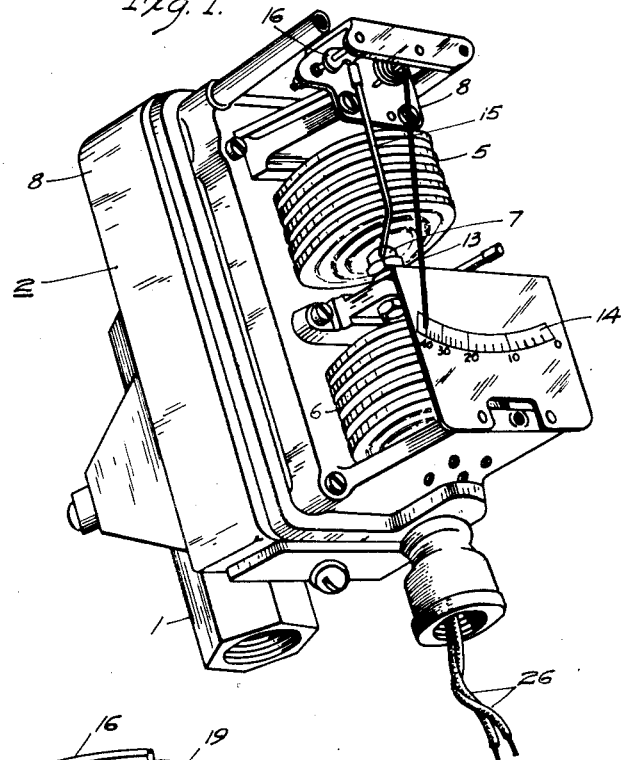
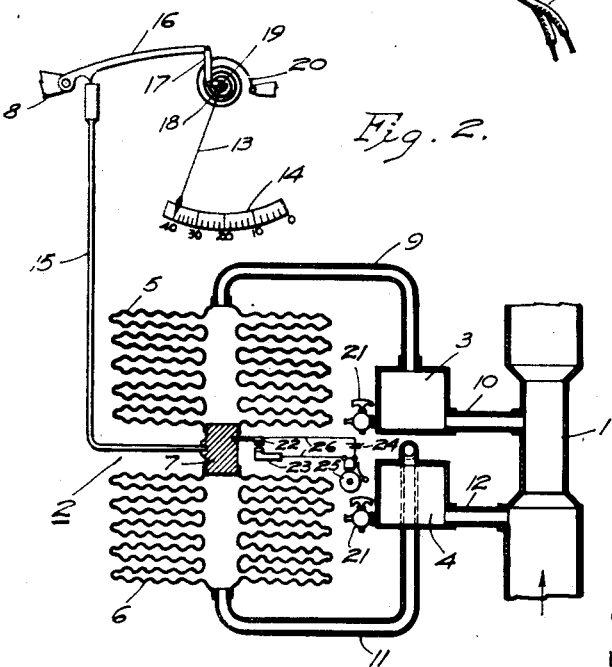
INVENTOR
George D. Clark.
BY
Wesley G. Carr
ATTORNEY Patented Feb. 28, 1933

1,899,672

UNITED STATES PATENT OFFICE

GEORGE D. CLARK, OF SHARPSVILLE, PENNSYLVANIA, ASSIGNOR TO WESTINGHOUSE ELECTRIC & MANUFACTURING COMPANY, A CORPORATION OF PENNSYLVANIA

FLUID-FLOW INDICATOR

Application filed January 18, 1929. Serial No. 333,467.

My invention relates to fluid-flow indicators and more particularly to water-flow indicators for use in transformer water cooling systems.

My invention has for an object to provide a fluid-flow indicator having air traps associated therewith that may be readily cleaned and easily removed for inspection and repair.

Another object of my invention is to provide means in a bellows water-flow indicator, whereby no water enters either of the bellows, thereby obviating the possible freezing of the indicator in cold weather.

A still further object of my invention is to provide a fluid-flow indicator comprising a simple compact structure having minimum number of parts.

My invention may be more readily understood by reference to the accompanying drawing which illustrates a preferred modification of my invention.

Figure 1 is a perspective view of a fluid-flow indicator constructed in accordance with my invention.

Fig. 2 is a view in elevation, partially in section, of the device illustrated in Fig. 1.

The primary purpose of my water-flow indicator is to measure the rate of flow of a liquid, such as water, that is being supplied to a transformer for cooling purposes. My device utilizes a Venturi tube 1 and a differential pressure gauge 2 connected therewith through air traps 3 and 4 to measure the rate of flow of a liquid.

Two bellows structures 5 and 6 are mechanically connected by a rigid member 7 and are fixedly mounted at their outer ends to a base 8. The upper bellows 5 communicates with the air trap 3 through pipe 9 and the air trap communicates with the Venturi tube 1 through pipe 10 so that the bellows 5 is subjected to a pressure in accordance with the pressure in the reduced section of the Venturi tube. The lower bellows 6 is similarly connected by a pipe 11 to the top of the air trap 4 and by a pipe 12 from the bottom of the air trap 4 to the large section of the Venturi tube 1.

Since the bellows 5 and 6 are connected to the small and large sections, respectively, of the Venturi tube 1, they respond to the different pressures at those sections and the rigid member 7 is actuated in accordance with the difference of the two pressures.

The movement of the member 7 is multiplied and translated to an indicating pointer 13 and scale 14, that is conveniently calibrated in rate of fluid flow, by means of a rigid member 15 mounted on the member 7, a lever 16 pivoted to the base 8 and resting with point-contact on the member 15 and link 17 connecting the end of the lever 16 to the crank 18 that is in turn secured to the pivoted axis 19 of the pointer 13. A spring 20 returns the pointer 13 to its initial position.

The air traps 3 and 4 are provided with petcocks 21 for draining purposes when the tube 1 is empty, for example, when the transformer cooling coils fed thereby are drained. The air traps 3 and 4 prevent water from entering the bellows 5 and 6 and freezing and, in addition, prevent them from becoming clogged with dirt from the water the flow-rate of which is being measured.

An electrical contact operated by the movement of the member 7 may be provided for operating an alarm when the rate of water-flow through the tube 1 exceeds a predetermined amount. For this purpose contact 22 is mounted on the member 7 and coacts with a stationary contact 23 mounted on the base 8 of the device.

The establishment of connection between the two contacts 22 and 23 closes as alarm circuit 26 including a battery 24 and an alarm, such as a bell 25, for indicating the dangerous condition of the water-flow. Since the contacts 22 and 23 are removed from the liquid stream they are not subjected to corrosive action that has heretofore been a serious disadvantage in prior types of water-flow indicators, and, in addition, they may be used to close an alternating or a direct current control circuit if desired.

The advantages of my water-flow indicator over those of the prior art are apparent from the above description. The indicator scale is always readily readable, the alarm circuit contacts are removed from the liquid stream and are consequently free from corrosion, the device may be readily cleaned, the bellows are not subject to freezing because they do not contain any liquid, and the contacts permit of the use of either A. C. or D. C. energized control circuits.

The above novel features obviate most of the difficulties heretofore encountered in water-flow indicators and my device fills the urgent need, in the transformer field especially, for a water-flow indicator having the above enumerated characteristics.

Various modifications may be made in my invention without departing from the spirit and scope thereof and I desire, therefore, that only such limitations shall be placed thereon as are imposed by the prior art and set forth in the appended claims.

Having thus described my invention, what I claim is:

1. In combination, a Venturi tube, a base mounted thereon and including three projecting standards, differentially expansible bellows mounted on said standards and facing each other, a scale mounted on one of said standards, a pointer for the scale pivotally mounted on another of said standards, an element mounted on another of said standards between the bellows and responsive to differential movement of the bellows, and means for transmitting movement of said element to said pointer.

2. In combination, a Venturi tube, a casing mounted thereon including air traps, differentially expansible bellows mounted on the casing, means providing communicating passages between said bellows and the high and low-pressure sections of said tube, respectively, through said air traps and means responsive to differential movement of the bellows.

3. In combination, a Venturi tube, a casing mounted thereon enclosing air traps and embodying a pair of projecting standards, differentially expansible bellows mounted on said standards and facing each other, means providing communicating passages between said bellows and the high and low-pressure sections of said tube, respectively, through said traps, a scale mounted on one of said standards, a pointer for the scale pivotally mounted on the other standard, and means cooperating with the bellows and extending from a position therebetween to a position adjacent to the pointer pivot for actuating the pointer.

4. In combination, a Venturi tube, a casing mounted thereon enclosing air traps and embodying a pair of projecting standards, differentially expansible bellows mounted on said standards and facing each other, means providing communicating passages between said bellows and the high and low-pressure sections of said tube, respectively, through said traps, a scale mounted on one of said standards, a pointer for the scale pivotally mounted on the other standard, a spring mounted on said other standard for controlling the movement of the pointer, pivoted lever means also mounted on said other standard and connected to the pointer, a stationary bearing element on the casing between the bellows, a movable bearing element cooperating with said stationary bearing element and connecting the bellows, and a rod extending between said movable bearing element and said pivoted lever means and cooperating with the lever arm means for transmitting differential movement of the bellows to the pointer.

5. In combination, in a compact, self-contained unit, a Venturi tube, a single base supported directly on said tube and enclosing a plurality of air traps, differentially expansible bellows mounted on said base and communicating with said tube through said traps, and means responsive to differential movement of the bellows supported by said base.

In testimony whereof, I have hereunto subscribed my name this 9th day of January, 1929.

GEORGE D. CLARK.